(12) United States Patent
Draudins et al.

(10) Patent No.: US 11,027,518 B2
(45) Date of Patent: Jun. 8, 2021

(54) ELECTRICALLY CONDUCTIVE MULTI-LAYER MATERIAL

(71) Applicants: Kristaps Draudins, Garkalnes novads (LV); Armands Liede, Riga (LV); Karlis Senhofs, Ikskiles novads (LV); Eriks Stankevics, Kekavas novads (LV)

(72) Inventors: Kristaps Draudins, Garkalnes novads (LV); Armands Liede, Riga (LV)

( * ) Notice: Subject to any disclaimer, the term of this patent is extended or adjusted under 35 U.S.C. 154(b) by 159 days.

(21) Appl. No.: 16/071,488

(22) PCT Filed: Jan. 27, 2016

(86) PCT No.: PCT/IB2016/050392
§ 371 (c)(1),
(2) Date: Jul. 20, 2018

(87) PCT Pub. No.: WO2017/130023
PCT Pub. Date: Aug. 3, 2017

(65) Prior Publication Data
US 2019/0022972 A1    Jan. 24, 2019

(51) Int. Cl.
*B32B 7/00* (2019.01)
*B32B 5/02* (2006.01)
(Continued)

(52) U.S. Cl.
CPC ............... *B32B 5/024* (2013.01); *B32B 3/08* (2013.01); *B32B 5/02* (2013.01); *B32B 5/22* (2013.01);
(Continued)

(58) Field of Classification Search
CPC .......... B32B 5/024; B32B 7/00; B32B 17/02; B32B 17/007; B32B 2307/3065;
(Continued)

(56) References Cited

U.S. PATENT DOCUMENTS

2007/0105467 A1* 5/2007 Bennett ................... B32B 27/04
442/141
2010/0264266 A1* 10/2010 Tsotsis ................... D06M 11/83
244/117 R (Continued)

FOREIGN PATENT DOCUMENTS

DE         10036362 C2    6/2002
GB         1 478 919 A    7/1977
(Continued)

OTHER PUBLICATIONS

ISR; Federal Institute of Industrial Property, Moscow; dated Jun. 6, 2016.

*Primary Examiner* — Matthew D Matzek
(74) *Attorney, Agent, or Firm* — Patshegen IP LLC; Moshe Pinchas

(57) ABSTRACT

The invention relates to conductive multi-layer materials for leak detection applications. The electrically conductive multi-layer material comprises a woven glass fibre web (2) having a binding agent (4) and a fire retardant compound (5), which is impregnated with electrically conductive carbon particles (6), wherein one side of the glass fibre web (2) is coated with metallic electrically conductive layer (10) by the means of vacuum deposition.

9 Claims, 2 Drawing Sheets

(51) Int. Cl.
  *C03C 25/14*   (2018.01)
  *C03C 25/46*   (2006.01)
  *C03C 25/47*   (2018.01)
  *B32B 5/26*    (2006.01)
  *D06M 11/84*   (2006.01)
  *B32B 5/22*    (2006.01)
  *B32B 3/08*    (2006.01)
  *B32B 17/04*   (2006.01)
  *B32B 17/02*   (2006.01)

(52) U.S. Cl.
  CPC ............... *B32B 5/26* (2013.01); *B32B 7/00* (2013.01); *B32B 17/02* (2013.01); *B32B 17/04* (2013.01); *C03C 25/14* (2013.01); *C03C 25/46* (2013.01); *C03C 25/47* (2018.01); *D06M 11/84* (2013.01); *B32B 2250/05* (2013.01); *B32B 2255/02* (2013.01); *B32B 2255/205* (2013.01); *B32B 2255/28* (2013.01); *B32B 2260/021* (2013.01); *B32B 2260/025* (2013.01); *B32B 2260/046* (2013.01); *B32B 2262/101* (2013.01); *B32B 2264/108* (2013.01); *B32B 2307/202* (2013.01); *B32B 2307/3065* (2013.01); *B32B 2307/7246* (2013.01); *B32B 2307/7265* (2013.01); *B32B 2307/752* (2013.01); *B32B 2419/00* (2013.01); *B32B 2419/06* (2013.01); *B32B 2607/00* (2013.01)

(58) Field of Classification Search
  CPC ....... C03C 25/47; C03C 25/14; C03C 25/143; C03C 25/22; C03C 25/226; E02D 31/00–31/006
  USPC ................ 442/180, 230, 231, 136; 428/921; 427/123, 124, 585; 264/642
  See application file for complete search history.

(56) References Cited

U.S. PATENT DOCUMENTS

| | | | |
|---|---|---|---|
| 2011/0049292 A1* | 3/2011 | Kruckenberg | D06M 11/74 244/1 A |
| 2013/0130582 A1* | 5/2013 | Zheng | C08L 61/24 442/180 |
| 2015/0203693 A1* | 7/2015 | Mestan | C08L 23/16 428/195.1 |

FOREIGN PATENT DOCUMENTS

| | | |
|---|---|---|
| JP | 2011528758 A | 11/2011 |
| NO | 911279 A | 5/1991 |
| RU | 2021303 C1 | 10/1994 |
| WO | 9811414 A1 | 3/1998 |
| WO | 2004/071760 A1 | 8/2004 |
| WO | 2011/045354 A1 | 4/2011 |
| WO | 2011045354 A1 | 4/2011 |

* cited by examiner

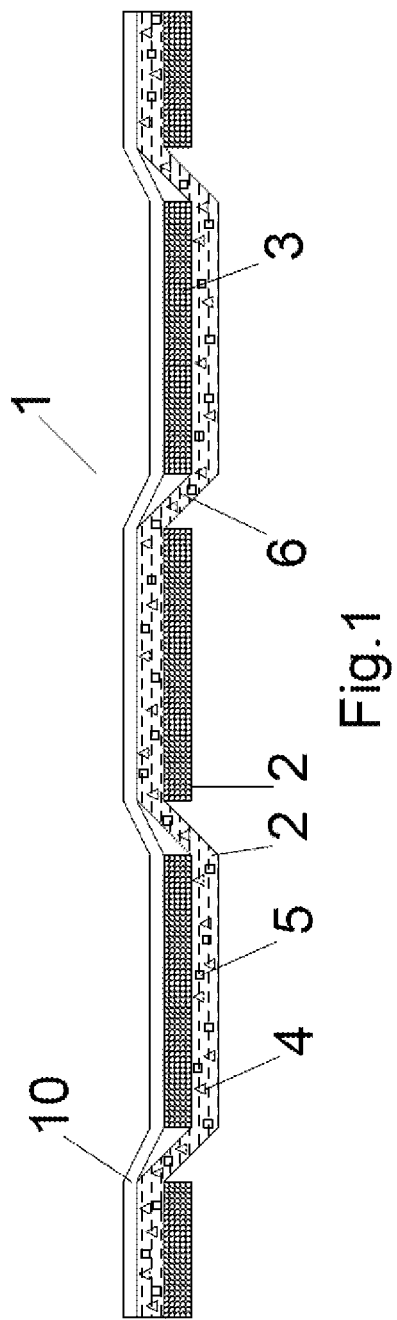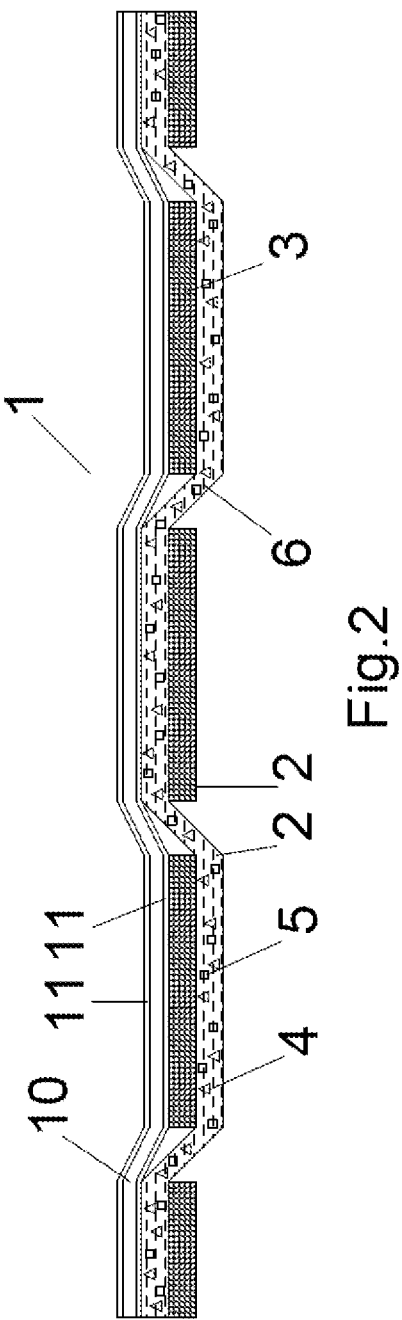

ELECTRICALLY CONDUCTIVE MULTI-LAYER MATERIAL

TECHNICAL FIELD

The invention relates to electrically conductive multi-layer materials for leak detection applications. The conductive multilayer materials are especially suitable for water tightness inspections on roofs. The invention further relates to the method of manufacture of said materials as well as the use thereof.

BACKGROUND ART

Because the purpose of a roof is to protect people and their possessions from climatic elements, the insulating properties of a roof are a consideration. It is necessary to provide a means to control its water tightness. Several number of methods and devices have been developed, unfortunately none of them is significantly accurate or effective up to date. Accordingly, a late detection and location of the roof seal damage can cause considerable damage to the overall roof structure and even to the building itself. Therefore, it is necessary to develop such a sealing, which implements precise and effective leak detection applications. European patent No. EP2488361 discloses a method for producing a multilayer sealing structure comprising an electrically conductive inner layer made of asphalt sheets, and asphalt sheets for such a sealing structure.

German patent No. DE19638733 discloses plastic seal damage detection method. U.S. Pat. No. 5,362,182 discloses a waste disposal landfill having subsurface impermeable sheets, which can be monitored with respect to their permeability.

U.S. Pat. No. 5,850,144 discloses a leak testable, fluid impervious membrane formed as a laminate of a conductive mesh scrim between upper and lower insulative polymeric resin layers.

U.S. Pat. No. 8,604,799 discloses a structural seal with electrically conductive layer which is arranged inside or outside structural seal and extends over substantially the entire surface of the structural seal.

German patent application No. DE10036362 discloses a system for location of leaks from sealed building structures, e.g. flat roofs, has an electrically conductive layer beneath the sealant layer and an outer electrode within which the voltage distribution is measured.

The drawback of the above-mentioned multilayer materials comprising electrically conductive layers are their complicated installation in structures to be sealed. They are subject to delamination, which decrease its measurement accuracy and effectiveness. More complicated installation leads to increased costs. Additionally, state of art conductive layers do not provide effective conductivity properties overall and separate points in the sealed structure. Therefore, the aim of the invention is to create a conductive layer with increased conductivity properties and easier installation in structures to be sealed.

SUMMARY OF THE INVENTION

The aim is reached by design of an electrically conductive multi-layer material for applying it under a non-conductive water isolation layer. It can also by applied between multiple water insolation layers. The multi-layer material comprises a woven glass fibre web or fabric, which comprises a binding agent and a fire retardant compound. Generally, the glass fibre web or fabric is formed by weaving, made of many glass fibres woven on a warp and a weft. The binding agent can be any vinyl polymer, preferably polyvinyl acetate (PVA). The fire retardant compound is organozinc compound. The woven glass fibre web is impregnated with electrically conductive carbon particles. Additionally, one side of the woven glass fibre web is coated with metallic electrically conductive layer by the means of vacuum deposition. In the result the woven glass fibre web comprises a metallic electrically conductive coating. Said vacuum deposition can be accomplished by implementing such vacuum deposition methods as thermal evaporation or sputtering.

The woven glass fibre web is impregnated with the binding agent and the fire retardant compound in the same way as electrically conductive carbon particles. The woven glass fibre can be impregnated with said members using known chemical processing technologies.

The metallic conductive layer or coating is a metal layer selected from the group of metals containing aluminium (Al), copper (Cu), aluminium-copper alloy (Al/Cu), silver (Ag), gold (Au), tin (Sn), chromium (Cr), iron (Fe), molybdenum (Mo), niobium (Nb), nickel (Ni), nickel-chromium alloy (NiCr), palladium (Pd), platinum (Pt), silicon (Si), tantalum (Ta), titanium (Ti) and stainless steel.

Electrically conductive particles can be made from electrically conductive carbons such as carbon black, graphite and carbon nanotubes (C-nanotubes).

Additionally, the metallic electrically conductive layer is covered or coated from one or from both sides with corrosive resistant layer, such as nickel layer or zinc layer. Any metal having corrosive resistant properties can be used for the corrosive resistant layer.

Invention also includes a method or manufacture an electrically conductive multi-layer material as described above. The method comprises the following steps:
a) providing a woven glass fibre web which comprises a binding agent and a fire retardant agent;
b) impregnating the woven glass fibre web with electrically conductive carbon particles;
c) coating of impregnated woven glass fibre web with metallic electrically conductive layer by means of vacuum deposition, which can be thermal evaporation or sputtering.

The method comprises further steps, wherein before the step c) the impregnated woven glass fibre web is coated with a nickel layer by means of vacuum deposition and after the step c) the coated woven glass fibre web is again coated with a nickel layer by means of vacuum deposition.

The electrically conductive multi-layer material can be used in the leak detection applications for roof, wall or even tunnel structures or any other structure where precise and effective leak detection is necessary.

BRIEF DESCRIPTION OF THE DRAWINGS

The following disclosure will be better understood by a person skilled in the art when read in conjunction with the figures.

FIG. 1 illustrates a cross-section of electrically conductive layer.

FIG. 2 illustrates a cross-section of electrically conductive layer further comprising nickel layers.

Figure 3:
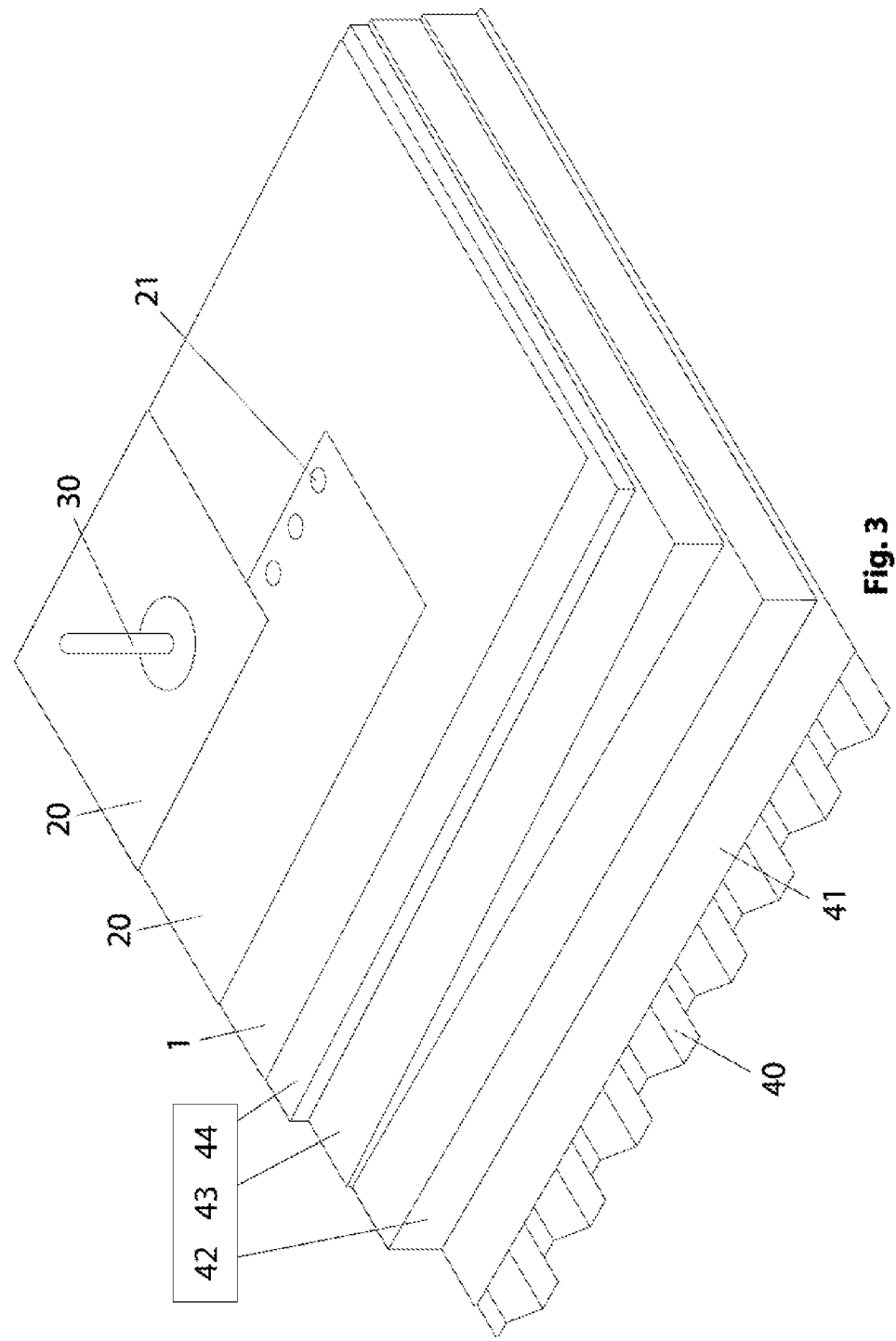
FIG. 3 shows a perspective view of insulated roof structure, where it has a cut-out to illustrate all the elements of the example roof structure.

Preferred embodiment of the invention is an electrically conductive multi-layer material 1 (see FIG. 1) comprises the woven glass fibre web 2, which comprises a polyvinyl acetate (PVA) 4 (shown under the symbol—triangle—in the FIGS. 1 and 2) as a binding agent 4 and an organozinc compound 5 (shown under the symbol rectangular in the FIGS. 1 and 2) as a fire retardant compound 5, and is impregnated with electrically conductive carbon black particles 6 (shown under the symbol—small lines—in the FIGS. 1 and 2) as an electrically conductive carbon particles 6. Said glass fibre web 2 is made of many glass fibres 3 woven on a warp and a weft. One side of the glass fibre web 2 is coated with an aluminium layer 10 by the means of thermal evaporation, creating aluminium coating.

Another embodiment further comprises a corrosive resistant layer 11 (see FIG. 2). The aluminium layer 10 is coated from both sides with a nickel layer 11.

In use, the electrically conductive multi-layer material 1 is laid on a roof structure. Said example of the roof structure comprises a bearing structure 40, covered by vapour barrier 41, which is subsequently covered by insulation layers 42, 43, 44. The insulation layers are an insulation base layer 42, an insulation slope forming layer 43 and an insulation surface layer 44. The electrically conductive multi-layer material 1 is laid above said insulation surface layer 44. The roof structure is sealed by a water insulation layer 20. Additionally the roof structure is provided with contact devices 30. These contact devices 30 are configured to provide an electric contact between the electrically conductive multi-layer material 1 and sealing inspection device (not shown in figure) to used for leak detection applications.

Another embodiment is possible where the electrically conductive multi-layer material 1 is used in wall structures of the building for implementing the leak detection applications.

In another embodiment of electrically conductive multi-layer material it comprises the woven glass fibre web 2, which comprises the polyvinyl acetate (PVA) 4 and the organozinc compound 5, and is impregnated with the electrically conductive carbon black particles 6, wherein said one side of the glass fibre web 2 is coated with the stainless steel layer 10 by the means of vacuum deposition. Additionally, said stainless steel or steel layer 10 is coated from one or both sides with the nickel layer 11.

While the inventions have been described with reference to certain embodiments, it will be understood by those skilled in the art that various changes may be made and equivalents may be substituted without departing from the scope of the invention. Therefore, it is intended that the inventions not be limited to the particular embodiments disclosed herein.

The invention claimed is:

1. Electrically conductive multi-layer material (1) for applying it under a non-conductive water insulation layer, comprising a woven glass fibre web (2) which comprises a binding agent (4) which is a polyvinyl acetate (PVA) and a fire retardant compound (5) which is an organozinc compound, and is impregnated with electrically conductive carbon particles (6), wherein one side of the glass fibre web (2) is coated with a metallic electrically conductive layer (10) by the means of vacuum deposition.

2. The electrically conductive multi-layer material (1) according to claim 1, wherein the metallic electrically conductive layer (10) is a metal layer selected from the group of metals containing aluminium, copper, aluminium-copper alloy, silver, gold, tin, chromium, iron, molybdenum, niobium, nickel, nickel-chromium alloy, palladium, platinum, silicon, tantalum, titanium and stainless steel.

3. The electrically conductive multi-layer material (1) according to claim 1, wherein the electrically conductive carbon particles (6) are selected from the group of electrically conductive carbons containing carbon black, graphite and carbon nanotubes.

4. The electrically conductive multi-layer material (1) according to claim 1, wherein the metallic electrically conductive layer (10) is coated from both sides with a corrosive resistant layer (11) selected from the group of nickel and zinc layer (11).

5. The electrically conductive multi-layer material (1) according to claim 1, wherein said multi-layer material (1) comprises the woven glass fibre web (2) which comprises the polyvinyl acetate (PVA) and the organozinc compound (5), and is impregnated with the electrically conductive carbon particles (6), wherein said one side of the glass fibre web (2) is coated with the metallic electrically conductive layer (10) by the means of thermal evaporation, and wherein said metallic electrically conductive layer (10) is coated from both sides with a corrosive resistant layer (11).

6. The electrically conductive multi-layer material (1) according to claim 1, wherein the glass fibre web (2) is coated with the metallic electrically conductive layer (10) by the means of thermal evaporation or sputtering.

7. Method for manufacture of an electrically conductive multi-layer material (1) according to claim 1, wherein the method comprises the following steps:
  a) providing a woven glass fibre web (2) which comprises a binding agent (4) and a fire retardant agent (5);
  b) impregnating the woven glass fibre web (2) with electrically conductive carbon particles (6);
  c) coating of impregnated woven glass fibre web (2) with metallic electrically conductive layer (10) by means of vacuum deposition.

8. The Method according to claim 7, wherein before the step c) the impregnated woven glass fibre web (2) is coated with a nickel layer (11) by means of vacuum deposition and after the step c) the coated woven glass fibre web (2) is again coated with a nickel layer (11) by means of vacuum deposition.

9. The Method according to claim 8, wherein as the vacuum deposition is thermal evaporation or sputtering.

* * * * *